(12) United States Patent
Beck

(10) Patent No.: US 9,462,789 B2
(45) Date of Patent: Oct. 11, 2016

(54) ANIMAL TRAINING DEVICE, LEASH AND METHOD OF USING THE DEVICE AND LEASH

(71) Applicant: Sarah Jane Beck, Ft. Lauderdale, FL (US)

(72) Inventor: Sarah Jane Beck, Ft. Lauderdale, FL (US)

(73) Assignee: Jeffrey S. Melcher, Boca Raton, FL (US)

(*) Notice: Subject to any disclaimer, the term of this patent is extended or adjusted under 35 U.S.C. 154(b) by 0 days.

(21) Appl. No.: 15/081,972

(22) Filed: Mar. 28, 2016

(65) Prior Publication Data

US 2016/0235040 A1   Aug. 18, 2016

Related U.S. Application Data

(63) Continuation-in-part of application No. 14/880,702, filed on Oct. 12, 2015, now Pat. No. 9,295,230.

(60) Provisional application No. 62/192,981, filed on Jul. 15, 2015, provisional application No. 62/117,562, filed on Feb. 18, 2015.

(51) Int. Cl.
| | |
|---|---|
| *H01T 9/00* | (2006.01) |
| *A01K 27/00* | (2006.01) |
| *A01K 29/00* | (2006.01) |

(52) U.S. Cl.
CPC ........... *A01K 27/009* (2013.01); *A01K 27/003* (2013.01); *A01K 27/005* (2013.01); *A01K 29/005* (2013.01)

(58) Field of Classification Search
USPC ........................................................ 361/232
See application file for complete search history.

(56) References Cited

U.S. PATENT DOCUMENTS

| | | | |
|---|---|---|---|
| 4,091,383 A | 5/1978 | Rainville |
| 4,337,496 A | 6/1982 | Laird |
| 4,479,329 A | 10/1984 | Fraden |
| 4,802,482 A | 2/1989 | Gonda |
| 4,972,508 A | 11/1990 | King |
| 5,048,463 A | 9/1991 | Wilson |
| 5,214,411 A | 5/1993 | Herbruck |
| 5,243,327 A | 9/1993 | Bentz |
| 5,386,084 A | 1/1995 | Risko |

(Continued)

FOREIGN PATENT DOCUMENTS

| | | |
|---|---|---|
| DE | 3618785 | 12/1987 |
| WO | 2015/191167 | 12/2015 |

OTHER PUBLICATIONS

Response to International Search Report and Written Opinion filed in PCT/US2016/014967, Apr. 1, 2016, pp. 1-5.

(Continued)

*Primary Examiner* — Ronald W Leja
(74) *Attorney, Agent, or Firm* — Jeffrey S. Melcher; Manelli Selter PLLC

(57) ABSTRACT

A leash having a warning device that produces an arc sound and/or vibration generated by an electrical arc between electrodes in a manner such that no electricity can be imparted into a human or animal, and a method of using the leash. Also provided is an animal training device that mounts on a collar or harness worn by the animal, which produces an arc sound and/or vibration generated by an electrical arc between electrodes in a manner such that no electricity can be imparted into a human or animal, and a method of a using the animal training device.

31 Claims, 9 Drawing Sheets

(56) References Cited

U.S. PATENT DOCUMENTS

| | | | |
|---|---|---|---|
| 5,398,217 A | 3/1995 | Canelli | |
| 5,471,954 A | 12/1995 | Gonda | |
| 5,475,368 A | 12/1995 | Collins | |
| 5,606,305 A | 2/1997 | Jan | |
| 5,857,433 A | 1/1999 | Files | |
| 5,903,518 A | 5/1999 | Benwell | |
| 5,986,872 A | 11/1999 | Chaput | |
| 5,992,096 A | 11/1999 | De La Cerda | |
| 6,289,849 B1 | 9/2001 | Macedo | |
| 6,404,613 B1 | 6/2002 | Dowling | |
| 6,615,770 B2 | 9/2003 | Patterson | |
| 6,688,260 B2 | 2/2004 | Morrison | |
| 6,923,146 B2 | 8/2005 | Kobitz | |
| 8,020,481 B1 | 9/2011 | Beckwith | |
| 8,737,169 B1 | 5/2014 | DeWitt et al. | |
| 9,295,230 B1 * | 3/2016 | Beck | A01K 15/023 |
| 2003/0165042 A1 | 9/2003 | Stethem | |
| 2005/0033397 A1 | 2/2005 | Aisenbrey | |
| 2005/0035865 A1 | 2/2005 | Brennan | |
| 2006/0219187 A1 | 10/2006 | Krishnamurthy | |
| 2007/0095297 A1 | 5/2007 | Boyd | |
| 2007/0204804 A1 | 9/2007 | Swanson | |
| 2008/0173257 A1 | 7/2008 | Steiner | |
| 2008/0272920 A1 | 11/2008 | Brown | |
| 2009/0102668 A1 | 4/2009 | Thompson | |
| 2011/0132275 A1 | 6/2011 | Huo | |
| 2012/0206856 A1 | 8/2012 | Norman | |
| 2014/0240890 A1 | 8/2014 | Bradshaw | |
| 2015/0216160 A1 | 8/2015 | Spence | |

OTHER PUBLICATIONS

Apple App, "ITazer Lite," pp. 1-2. Feb. 6, 2014.
International Search Report and Written Opinion issued in PCT/US2016/014967, Mar. 28, 2016, pp. 1-15.

* cited by examiner

ANIMAL TRAINING DEVICE, LEASH AND METHOD OF USING THE DEVICE AND LEASH

This application is a Continuation-In-Part of U.S. patent application Ser. No. 14/880,702, filed 12 Oct. 2015. This application also claims priority to U.S. Provisional Patent Application Serial Nos. 62/192,981, filed 15 Jul. 2015; and 62/117,562, filed 18 Feb. 2015, the complete disclosures of which are incorporated herein by reference.

FIELD OF THE INVENTION

The invention relates to an animal training device and method of training an animal. The invention further relates to a protection device from aggressive animals.

BACKGROUND OF THE INVENTION

Ultrasonic sound generating devises have been used to train or restrain dogs. U.S. Pat. No. 5,606,305 and DE 3618785 disclose such devices. However, a problem with ultrasonic sound devices is that humans cannot hear the sound and thus cannot verify that it is working. Furthermore, ultrasonic sound devices are not sufficient at scaring off aggressive dogs and are insufficient to be used as a training device.

Conventional sound generating devices are only capable of generating a simple tone, and not complex sounds.

Tasers have been used to train dogs. However, tasers can cause unwanted harm or death of the dog. Furthermore, tasers are classified as weapons and, thus, cannot be carried in many locations such as on planes and cannot be carried by mail carriers or other government officials. In addition, tasers often do not generate a sufficient volume of sound.

U.S. Pat. No. 5,857,433 (Files) and U.S. Pat. No. 6,923,146 (Kobitz), and Published U.S. Patent application Ser. Nos. 2005/0035865 (Brennan); 2008/0272920 (Brown); 2007/0204804 (Swanson); 2009/0102668 (Thompson) disclose animal training, pet locator and containment devices that utilize shock (taser) collars and GPS to set boundaries for an animal and also use remote controls for controlling the shock collars. The complete disclosure of these patents and applications are incorporated herein by reference.

U.S. Pat. No. 6,688,260 (Morrison), U.S. Pat. No. 6,289,849 (Macedo) and published U.S. patent application Ser. No. 2008/0173257 (Steiner) disclose a retractable dog leash. Published international PCT application No. WO 2015/191167 (Crucs) discloses a retractable dog leash with a pressure senor to determine the end of the dog leash. The complete disclosure of these patents and application are incorporated herein by reference.

There is no effective animal training and constraining device that completely avoids the chance of harm being caused. There is no effective solution to large animal, such as a large dog, pulling hard on a leash or trying to go past the end of the leash.

SUMMARY OF THE INVENTION

An objective of the invention is to provide a solution to a large animal pulling on a leash.

An objective of the invention is to constrain and/or train an animal that can be readily adapted to varying terrain when in the field.

In accordance with the method and apparatus of the present invention, the need for boundary fencing and wires is no longer necessary to confine and constrain an animal to a specific area. The method and apparatus of the present invention has the inherent ability to change the borders of the restraint area remotely to maximize the area's utility.

The objectives of the invention can be obtained by an animal leash comprising:
  a housing;
  a cord, wherein a first end of the cord being connected to the housing;
  a connector constructed to connect the cord to an animal collar or harness, the connector being connected to a second end of the cord; and
  an arc sound and/or vibration generating warning device comprising;
    a device body;
    a plurality of electrodes disposed within the device body, the electrodes being permanently encased so that no harmful electricity can be imparted into a human or animal from an arc generated across the electrodes;
    a power source;
    a transformer; and
  a switch, the electrodes being connected to the power source, the transformer, and the switch so that when the switch is activated an electrical arc is generated across the electrodes producing an arc sound and/or vibration.

The objectives of the invention can also be obtained by an animal training device comprising:
  a device body;
  a plurality of electrodes disposed within the device body, the electrodes being permanently encased so that no harmful electricity can be imparted into a human or animal from an arc generated across the electrodes;
  a power source;
  a transformer;
  a switch, the electrodes being connected to the power source, the transformer, and the switch so that when the switch is activated an electrical arc is generated across the electrodes producing an arc sound and/or vibration; and
  a global positioning device and/or remote control connected to the switch so that the switch can be activated by the global positioning device and/or remote control.

DETAILED DESCRIPTION OF THE INVENTION

Figure 1:
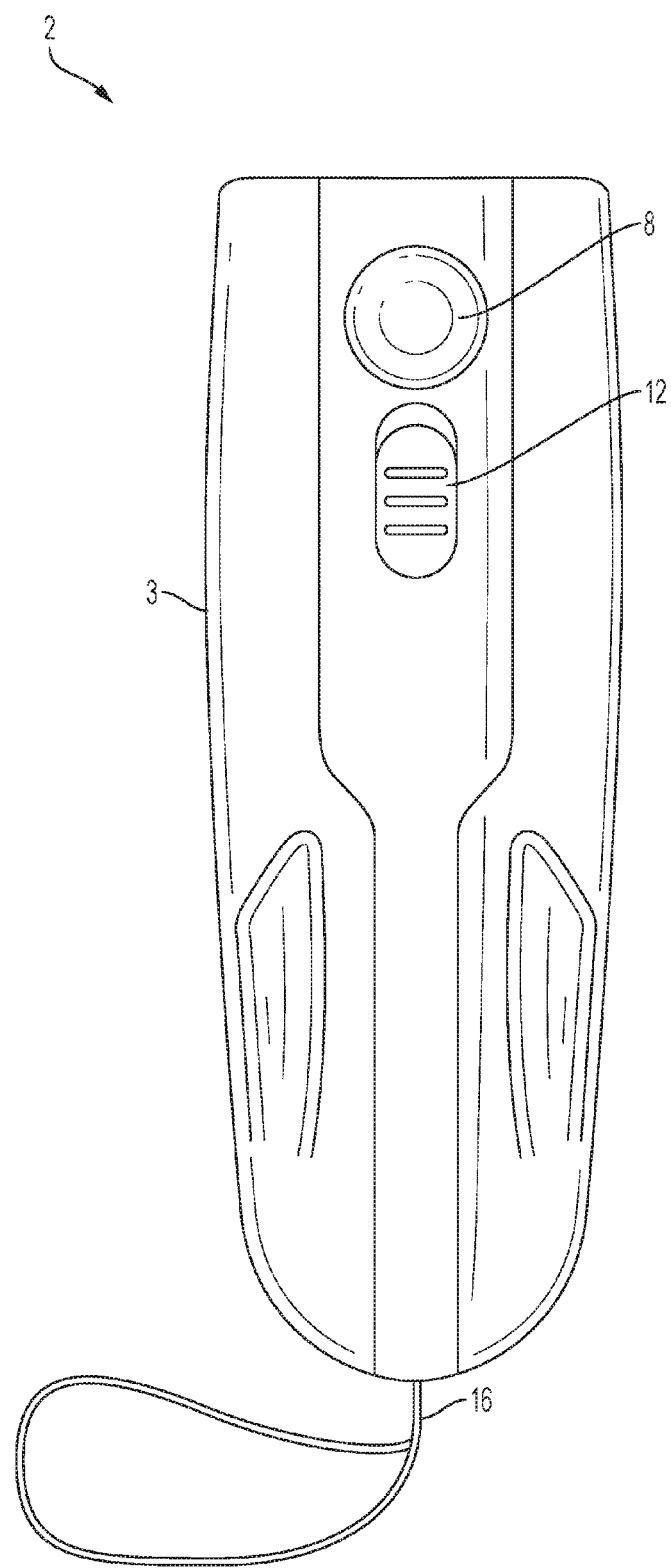
FIG. 1 illustrates a top view of an exemplary animal training device.
Figure 2:
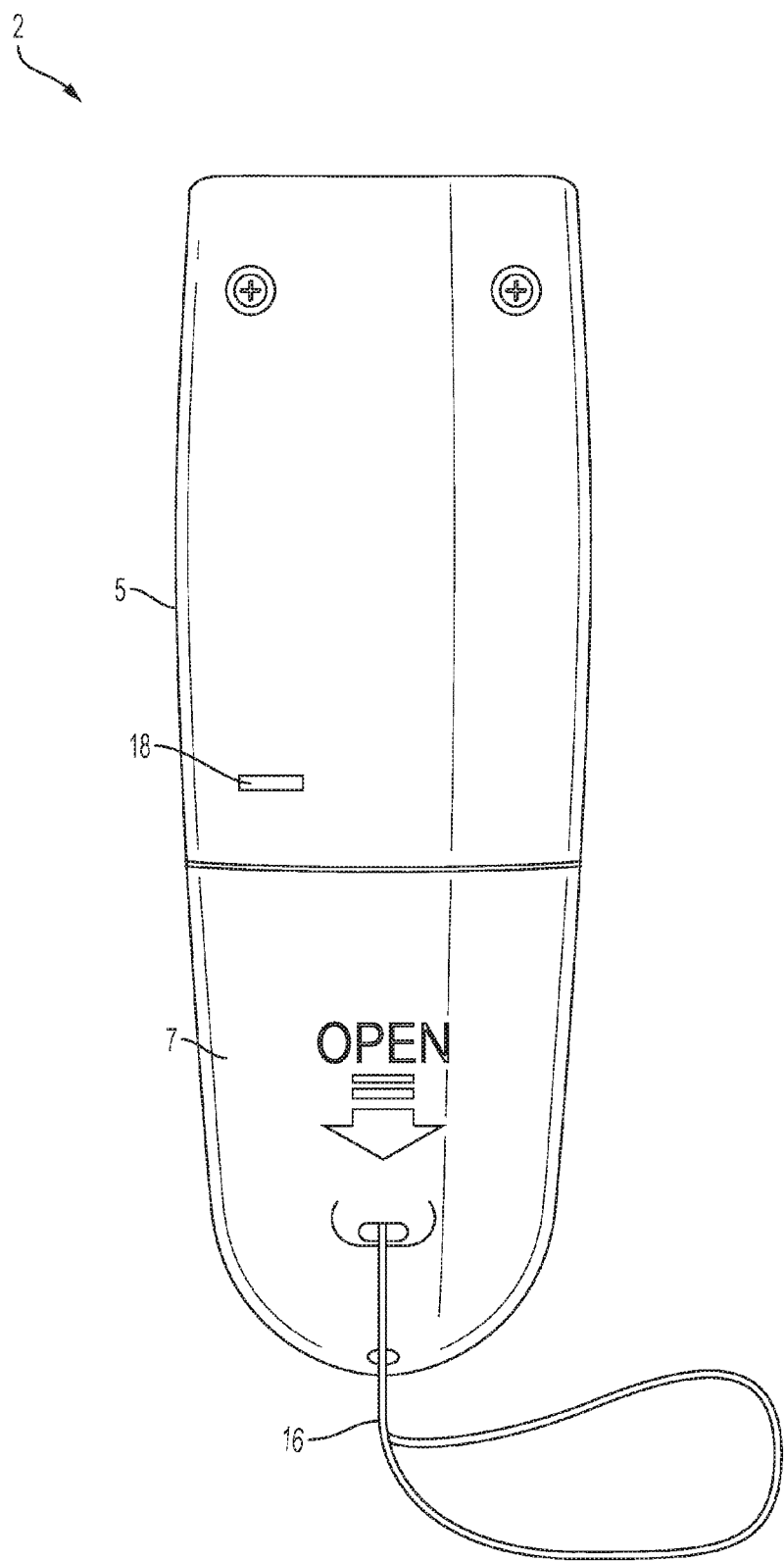
FIG. 2 illustrates a bottom view of an exemplary animal training device.
Figure 3:
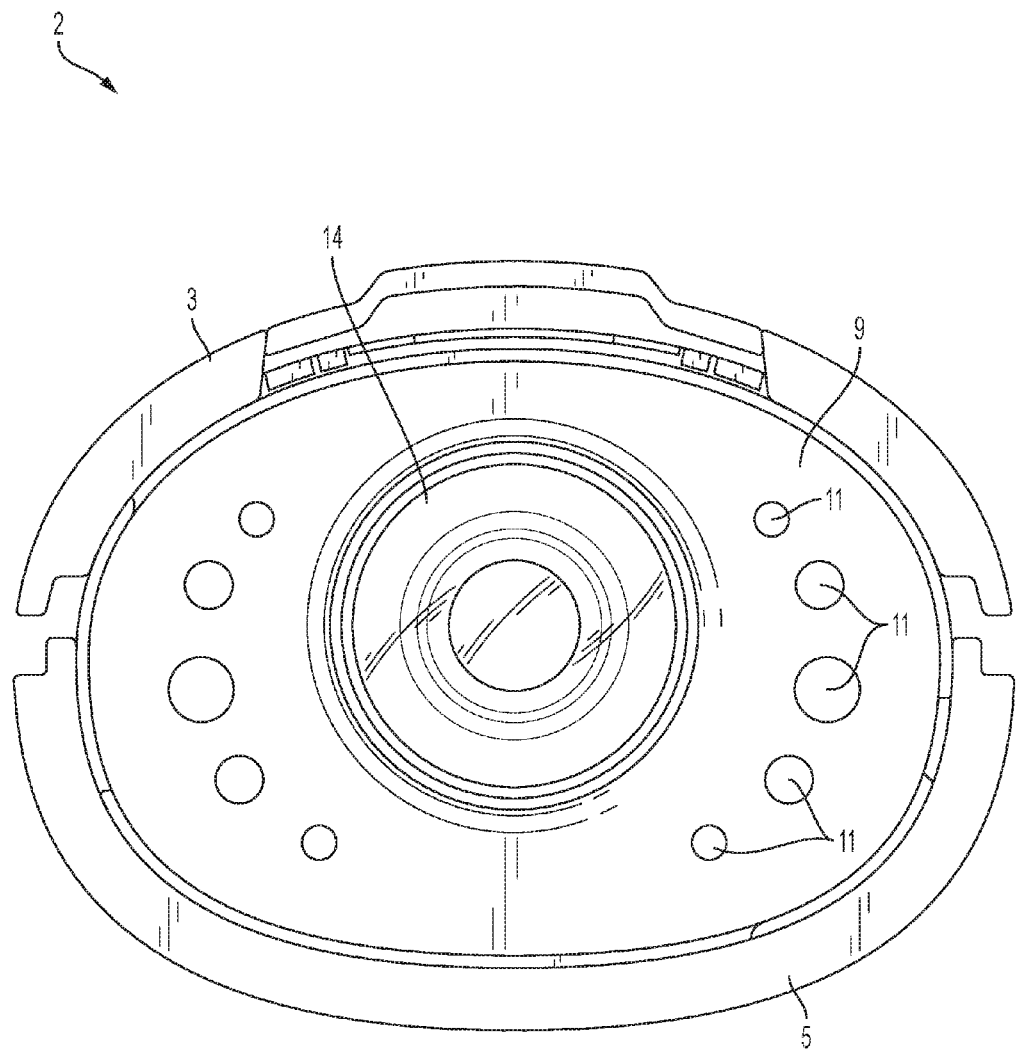
FIG. 3 illustrates a front view of an exemplary animal training device.
Figure 4A:
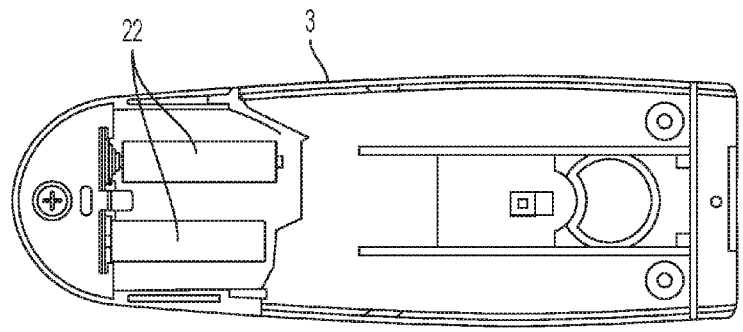
FIGS. 4A-4G illustrate views of the parts of an exemplary animal training device.
Figure 4B:
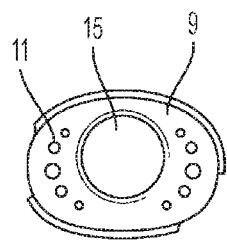
Figure 4C:
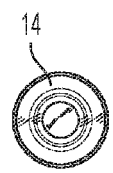
Figure 4D:
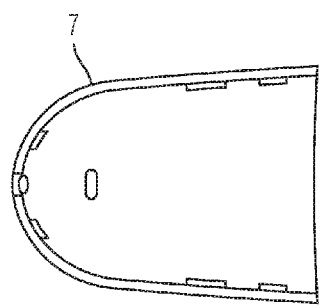
Figure 4E:
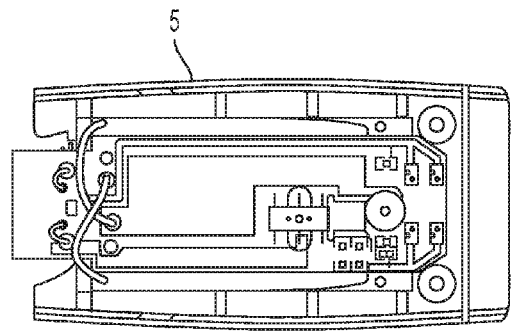
Figure 4F:
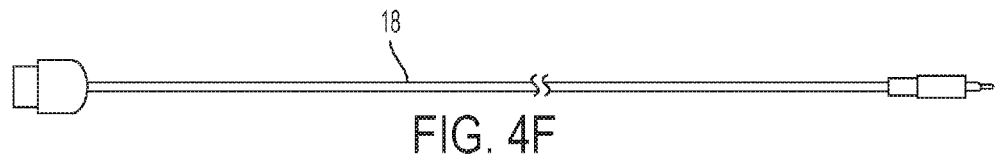
Figure 4G:
Figure 5:
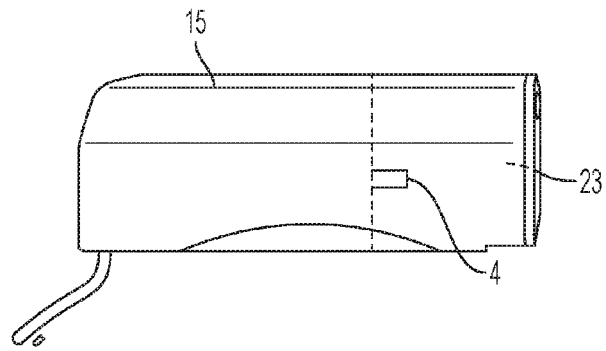
FIG. 5 illustrates a side view of an exemplary hollow chamber.
Figure 6:
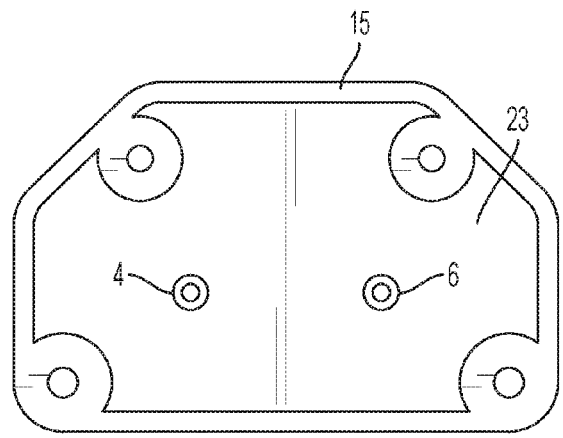
FIG. 6 illustrates a front view of an exemplary hollow chamber.
Figure 7:
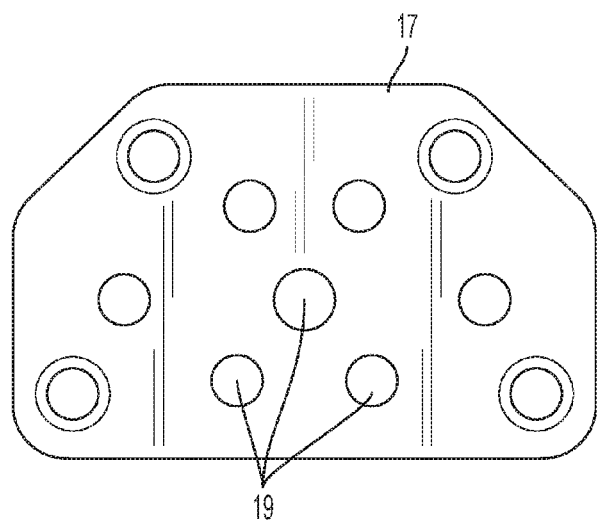
FIG. 7 illustrates a front view of a hollow chamber cover.

The invention will be described with reference to the attached non-limiting Figs. Taser devices are now well known. The term taser is used in its broadest interpretation to include tasers and stun-guns, both of which use the same electronics to generate an electrical arc across electrods. The animal training device 2 shown in FIGS. 1-7 modifies known tasers so that they are no longer capable of inflicting damage, i.e. cannot be used as a weapon and also, preferably enhances a deterrent arc sound and/or vibration, and also preferably focusses the arc sound and/or vibration in a desired direction. When the trigger 8 is activated, the animal training device 2 generates the arc sound and/or vibrations by the electrical discharge between electrodes 4 and 6 in a manner that scares animals, especially dogs. However, the electrodes 4 and 6 of the animal training device 2 are preferably permanently encased or otherwise modified so that no harmful electricity can escape into an individual or animal. The term "permanently encased" includes the use of fasteners, glue, heat sealing, welding, or other means, that make it difficult to expose the electrodes. An easily removed device cover is not considered permanently encased, i.e. a conventional taser having a removable cover designed to be used with the cover removed is not considered permanently encased. Permanently encased means not designed or intended to be opened by the user. The permanently encased electrodes cannot be touched by a human or animal during use of device. Permanently encased can include the use of holes or openings to allow the arc sound and/or vibrations to exit the device. In FIG. 1, the electrodes 4 and 6 of an exemplary device are internal to the device 2, so that the body of the device encases the electrodes 4 and 6. Conventional tasers have exposed (non-encased) electrodes that are designed to inject electricity into humans and animals. The electrodes 4 and 6 in the animal training device 2 described herein are preferably not designed to inject electricity into a human or animal. While not preferred, the current and voltage can be adjusted so that the output current is reduced to a level that does not cause pain, muscle contractions, or other harmful effects to a human or animal so that the electrodes can be exposed in a manner where the electrodes can be touched, i.e. not encased.

The external body of the device 2 is preferably constructed of a non-conducting material to avoid shocking a human user or animal. An example of a suitable non-conducting material is a non-conducting plastic, polymer, wood or plant product, glass, or composite. The outer body comprises an external body top 3, an external body bottom 5, a battery compartment cover 7, and a front cover 9. Holes 11 in the front cover 9 allow the arc sound and/or vibrations to leave the device 2 during activation. A battery 22 can be stored within the battery compartment.

A hollow chamber body 15 is disposed within the device 2. The electrodes 4 and 6 can be disposed within the hollow chamber 23 inside the hollow chamber body 15. A hollow chamber body cover 17 can be mounted on the hollow chamber body 15 to seal the electrodes 4 and 6 within the hollow chamber 23. The hollow chamber body cover 17 can include holes 19 for allowing the arc sound and/or vibrations to exit the hollow chamber. Even with the hollow chamber body cover 17 removed, the electrodes 4 and 6 can be recessed within the hollow chamber 23 so that they do not protrude from the hollow chamber body 15. In this example, the electrodes 4 and 6 are protected from the environment by the external body 3, 5 and 9 of the device 2 and also by the hollow chamber body 15. Thus, the electrodes are "permanently encased" twice in this example, once by the device body and secondly by the chamber body and chamber body cover. The external body can also comprise the chamber body if desired so that they are not separate parts.

The exemplary animal training device 2 has a power switch (trigger) 8. The power switch 8, or a separate switch, can be used to control the power of the electrical arc to increase or decrease the arc sound and/or vibrations (also referred to as taser sound) generated by the device 2.

Optional functions can be added, such as a flash light 14, flash light switch 12, wrist cord 16 and a connecter 18 for connecting the device to a battery charger 21 or other device. The arc sound and/or vibrations should be sufficiently loud for animals to detect at a desired distance from the user, such as at least 5 feet from the user, preferably at least 10 feet from the user.

The power switch 8 can be present on the external body of the device 2. A flashlight activation switch 12 can also be present on the external body. The battery 22 can be charged using the battery charger 21 connected to the connector 18. The connector 18 can be any desired connector, and can include connections for controlling the device 2. A non-limiting example of a suitable connector 18 is a USB port. The connector can also be a wireless connection.

Figure 8:
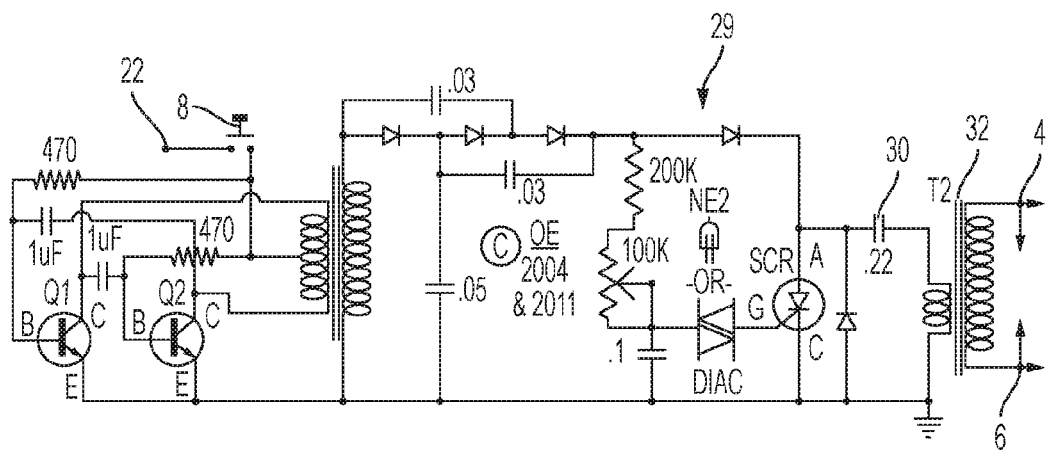
FIG. 8 illustrates an exemplary circuit.

A typical taser includes a power source 22, such as a battery, connected to a capacitor 30, transformer 32, switch 8, and electrodes 4 and 6. During operation, electricity arcs between the electrodes 4 and 6 generating the arc sound and/or vibrations. An exemplary circuit is shown in FIG. 8 that is suitable for use in the present invention. Taser circuitry is now well known and any suitable taser circuitry and power supply can be utilized in the present invention to generate an arc between the electrodes. Chargers 21 are also well known and any suitable charger can be utilized in the present invention.

The device 2 includes at least two electrodes 4 and 6 to generate the arc therebetween. More than two electrodes can be present. Since the electrodes are not exposed and the animal training device 2 is not constructed to deliver an electrical charge to an animal or human, the electrodes can have a different shape than conventional taser devices. One or more of the electrodes can have another function in the device 2. Essentially, any suitable part of the device 2 can be constructed to function as an electrode by forming the part of a material suitable for use as an electrode, such an electrical conductor. Electrical conductors are well known and any electrical conductor can be used. Exemplary electrical conductors include metals, graphite, and conducting polymers.

The animal training device 2 preferably includes a hollow chamber 23 defined by a chamber body 15. The hollow chamber 23 can be a resonator device and/or directional device to resonate an arc sound and/or vibration, and/or direct the arc sound and/or vibration in a desired direction. The hollow chamber 23 can be open or closed as desired. Preferably, the chamber body encases the electrical arc within the hollow chamber 23 so that the electrical arc cannot leave the hollow chamber 23 and an animal cannot contact the electrical arc. The chamber body 15 can have holes, such as holes 19 in the front cover 17, so that the arc sound and/or vibrations can exit the hollow chamber 23. The chamber body 15 can formed of any desired material. Preferably, the chamber body 15 is formed from a plastic or composite material.

Since one or more of the electrodes can have another function in the device 2, one or more of the electrodes can comprise a part of the hollow chamber body 15. A first electrode can be inside the hollow chamber 23 and a part of the chamber body 15 can be a second electrode. As another example, two different parts of the chamber body 15 can comprise the first and second electrodes. The chamber body parts to be used as an electrode can be formed of a material suitable for use as an electrode, such an electrical conductor.

The exemplary resonator device 2 can comprise the hollow chamber 23 having dimensions chosen to permit internal resonant oscillation of electromagnetic or acoustical waves of specific frequencies generated by the arc that can be detected by animals. Preferably, the resonator device is a sound resonator. Resonator devices are now well known and any suitable resonator device can be modified for use in the present animal training device.

Figure 9:
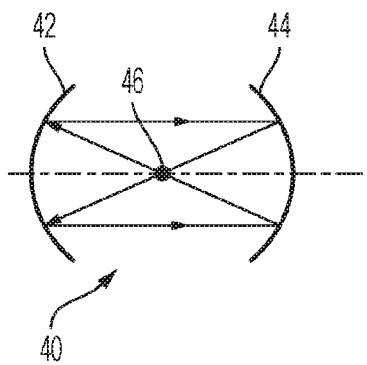
FIG. 9 illustrates an exemplary hollow chamber.

FIG. 9 shows an exemplary resonator device 40 having two chamber body parts 42 and 44, which is a stable resonator. A first electrode 46 can be present in the hollow chamber and one or more of the chamber body parts 42 and 44 can be the second electrode. The body parts 42 and 44 can comprise the first and second electrodes, or additional electrodes. In this example, the arc can be generated between the electrode 46 and one of the body parts 42 and 44, or the arc can be generated between the body parts 42 and 44. Alternatively, first and second electrodes 4 and 6 can be present inside or near the hollow chamber so that the arc sound and/or vibration is resonated within the hollow chamber.

Figure 10:
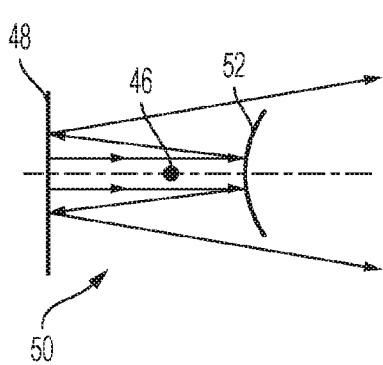
FIG. 10 illustrates an exemplary hollow chamber.

FIG. 10 shows an exemplary resonator device 50 having two chamber body parts 48 and 52, which is an unstable resonator. A first electrode 46 can be present in the hollow chamber and one or more of the chamber body parts 48 and 52 can be the second electrode. The chamber body parts 48 and 52 can comprise the first and second electrodes, or additional electrodes. In this example, the arc can be generated between the electrode 46 and one of the body parts 48 and 52, or the arc can be generated between the body parts 48 and 52. Alternatively, first and second electrodes 4 and 6 can be present inside or near the hollow chamber so that the arc sound and/or vibration can be resonated within the hollow chamber.

The directional device can comprise the hollow chamber 23 being constructed to direct the arc sound and/or vibrations in a desired direction, such as toward an animal. For example, the directional device can comprise the hollow chamber 23 with an opening facing the desired direction so that the arc sound and/or vibrations can be projected in the desired direction. Sound and vibrational direction devices are now well known and any suitable direction device can be modified for use in the present animal training device. The hollow chamber 23 is preferably constructed to be both a resonator device and a directional device.

Figure 11:
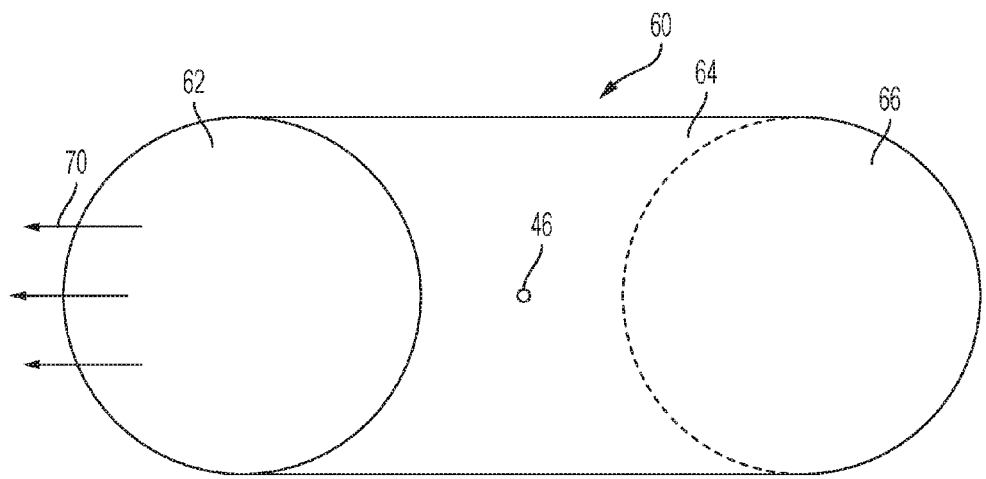
FIG. 11 illustrates an exemplary hollow chamber.

FIG. 11 illustrates and exemplary direction device 60 having a tube body 64 defining a tube. The tube body 64 can be sealed at one end 66 and have an opening 62 at the opposing end. The arc sound and/or vibrations can be directed out of the tube body 64 through the opening 62 in the direction shown by the arrows 70. A first electrode 46 can be present in the hollow chamber and a tube body part 64 can be the second electrode. Different parts of the tube body 64 and/or end 66 can be constructed to comprise the first and second electrodes, or additional electrodes. In this example, the arc can be generated between the electrode 46 and the tube body 64, or the arc can be generated between the different parts of the tube body 64 and/or tube end 66. Alternatively, first and second electrodes 4 and 6 can be present inside or near the hollow chamber so that the arc sound and/or vibration is directed out the opening 62.

The exemplary direction device 60 shown in FIG. 11 can also be sized and constructed to be a resonator in addition to being a directional device. The exemplary resonator devices shown in FIGS. 9 and 10 can be constructed to also act as the directional device. For example, a resonating device, such as shown in FIGS. 9 and 10, can be used in conjunction with a directing device, such as shown in FIG. 11, by incorporating the resonating device inside the directional device, having the resonating device in communication with the directional device, or having the directional device inside the resonating device.

The animal training device 2 is preferably constructed so that when damaged, such as by dropping or an animal biting the device 2, the device 2 will not issue a shock external to the device 2. For example, if a first electrode 46 is contained within the hollow chamber, with a part of the chamber body being the second electrode, when the hollow chamber is crushed by damage to the device 2, the chamber body can touch the first electrode 46 shorting out the device and not allowing an electrical charge to be generated.

The device 2 can have a safety mechanism built in. For example, the electrical circuits determine when resistance between electrodes changes, not allowing an electrical discharge to be generated. As another example, the device 2 can be constructed such as when one or more electrodes are exposed to ambient air the device will not function.

I discovered the unexpected benefits of the taser sound as a deterant and dog training device. There had been a couple of dogs attacking small dogs in my neighborhood so I decided to start carrying a taser in case I needed to protect my two small dogs. An incident occurred where the two dogs were attacking a small dog and just the sound of the taser stopped the dogs and the attack. I noticed that my two little dogs immediately took notice. I had been trying to train my rescued schnauzer for over a year to not bark incessantly at other dogs and people on our walks. My dog panicked and would lunge at people. Our walks were a nightmare. I had hired trainers at $150.00 a session, tried the gentle leader, shaking a jar of coins, a water bottle and treats. Nothing worked. After seeing the reaction to the taser sound I decided to try using the taser sound on our walks. I would say no barking and engage the taser sound. Within two weeks my dogs were completely trained. They no longer bark at other dogs or people and we can go on long walks. All if have to do is say no barking now and they behave perfectly. I have also used it when people come to my home. We now have a completely different experience with visitors. The sound stops dogs in their tracks.

I had an incident where a large dog got out of his home unleashed and would not stop when his owner called him. As the dog charged me, I said no barking to my dogs and the dogs stopped barking. I engaged the taser and the charging dog stopped, sat and waited for its owner.

The taser sound without the shocking device is a cutting edge solution and there is nothing like it known. The taser with the shocking portion is potentially dangerous to both dogs and to people and is considered a weapon. Government employees cannot carry a weapon. Additionally children cannot use a taser. The animal dog training device described herein is not a weapon.

I have tested simulated taser sounds on iphone apps and android phone apps, which I have found to have no effect on dogs. I have also tested a recorded taser sound which has no effect on dogs. The only sound that had an effect on dogs was the sound of the actual electrical discharge between the electrodes. Merely putting a removable cover on known tasers is not a solution, since the cover can merely be removed. The non-weapon dog training device described herein encases the electrodes. The electrodes can be constructed such that the device is not a weapon. Furthermore, the preferred device includes a hollow chamber not used on conventional tasers.

I have spoken to many people who have tried everything to modify their pets behavior to no avail. They do not want to use shock colors as they feel this is too severe, treats often do not work when your pet is under duress when walking, and many times they do not have the budget for a dog trainer. This device will serve many purposes in safe humane dog training and protection.

Figure 12:
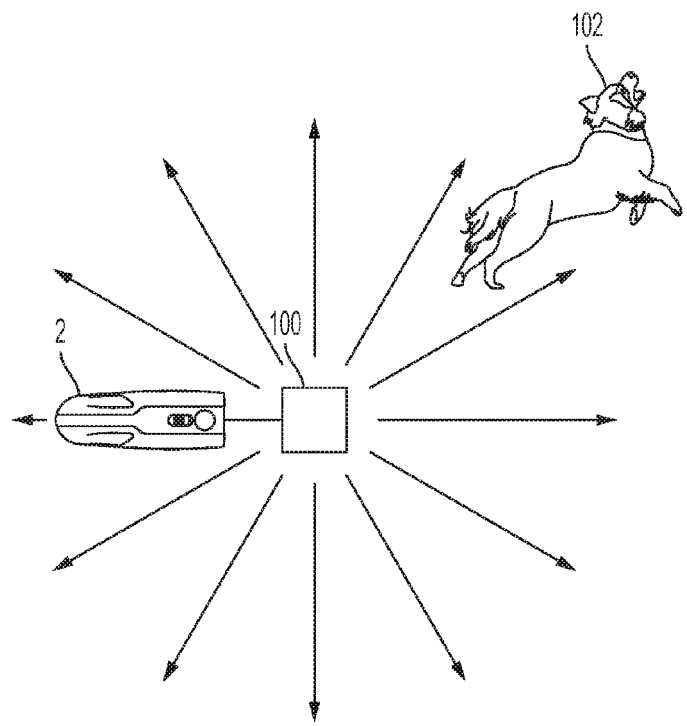
FIG. 12 illustrates an exemplary motion detector device.

As shown in FIG. 12, the invention can further comprise a motion detector 100 in communication with the device 2. Motion detectors 100 are now well known and any suitable motion detector can be used in the present invention. The device 2 can be connected to a motion detector 100 using a connector 21 (such as a USB port) or wirelessly using any desired wireless connection such as Bluetooth or Wifi, or the device 2 can include a motion detector 100. The motion detector can be used to activate the device. For example, when an animal 102 gets too close to the device 2 the device 2 is activated by the motion detector 100 generating the arc sound and/or vibrations, which prevents the animal 102 from approaching the location of the device 2. In this manner, the device 2 can be used to prevent animals 102 from entering or leaving a desired area, such a room in a home or a yard. The motion detector 100 and device 2 can be constructed to both operate from a battery so that they are easily portable to prevent an animal from approaching the desired location of the device 2. The device 2 and motion detector 100 can also be utilized to contain an animal 102 in a desired location by using a plurality of the devices 2 and motion detectors 100 to surround the desired location. The motion detector 100 can include a camera connected to the internet so the area can be monitored remotely by a smartphone connected to the internet. Examples of motion detector systems that can be modified for use in the present invention by connecting the device 2 described herein are disclosed in published U.S. patent application Ser. Nos. 20060219187 and 20070095287, and U.S. Pat. Nos. 4,479,329; 5,048,463; 5,992,096; 5,243,327; and 6,615,770, the complete disclosures of which are incorporated herein by reference.

Without being bound by any theory, I believe the device works because the arc generated is similar to lightning and thunder, which is scary to animals. I believe the animals can hear the arc sound and also detect the vibrations made by the arc. The animals may also be able to detect electromagnetism and/or electricity generated by the arc. Furthermore, the animals may be able to detect charged particles produced by the arc. The device is better than conventional tasers because a preferred version of the present device can resonate the sound and/or vibrations, and a preferred version of the device can direct the sound and/or vibrations in a desired direction.

Figure 13:
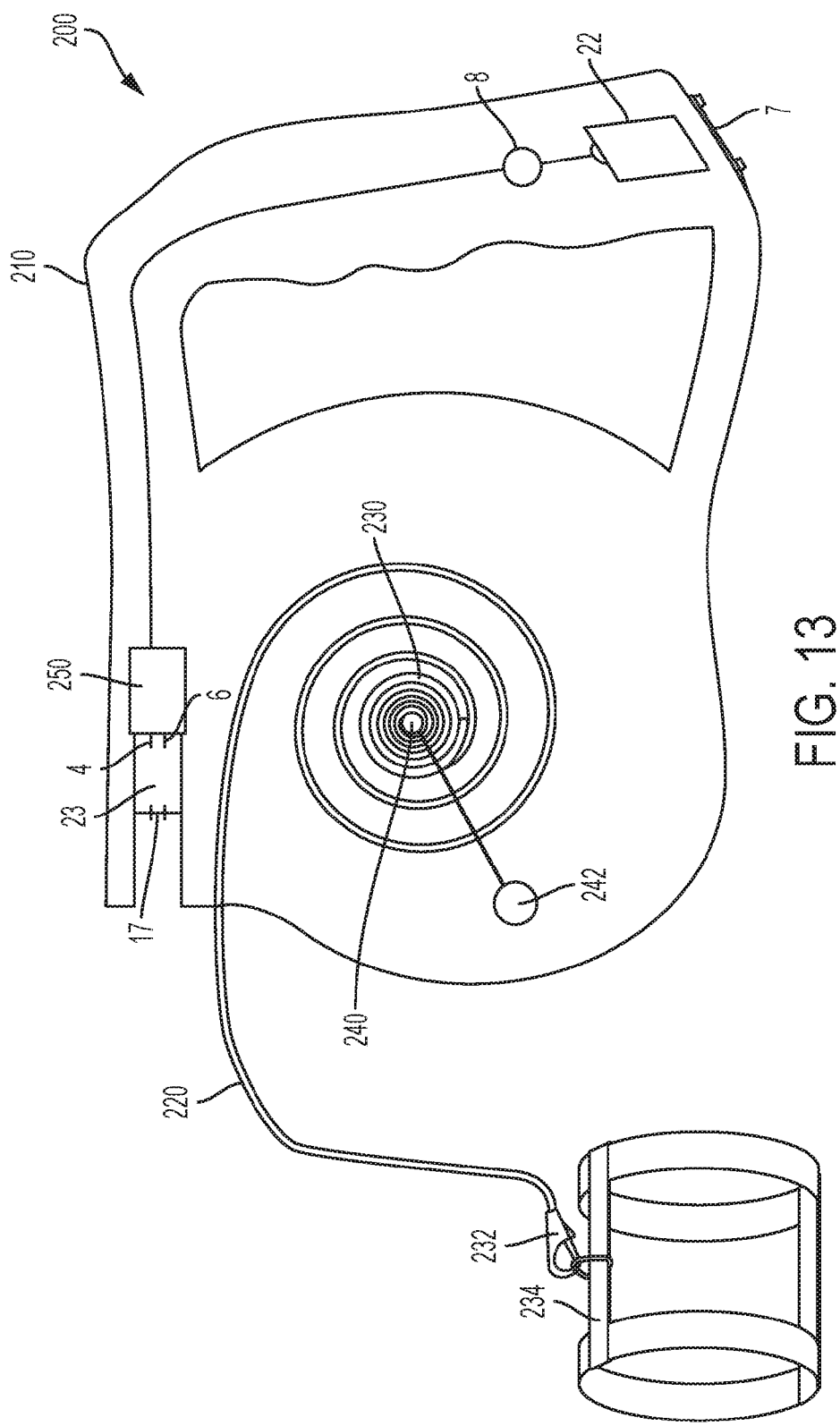
FIG. 13 illustrates and exemplary leash.

The device can be used in a retractable animal leash 200 embodiment as shown in FIG. 13. The retractable animal leash 200 includes a housing 210, a retractable cord 220 may be coiled to and uncoiled from the housing 210, a coiling device 230 biasing the retractable cord in a coiled position within the housing 210, and an arc sound and/or vibration generating warning device 250. The coiling device 230 can include a spring or motor. A first end of the cord 220 is connected to coiling device 230 and a second end of the cord is connected to a connector 232 for connecting the cord to a collar or harness 234. When the animal pulls too hard on the cord 220 or reaches the end of the retractable cord 220 a pressure sensing device 240 in communication with the cord 220 can activate the switch 8 to activate the device 250 to generate the arc sound and/or vibrations. The pressure sensing device 240 can preferably be adjusted 242 by the user to different levels of pressure for different size dogs or turned off. The animal can be any desired animal that can be walked on a leash including but not limited to dogs, cats, pigs and horses. The warning device 250 is the same as the device 2 described herein above, however, the external body of the device 2 is shaped to either be attached to the housing 210 or the housing 210 forms the external body, and the switch 8 can be connected to the pressure sensing device 240.

Figure 14:
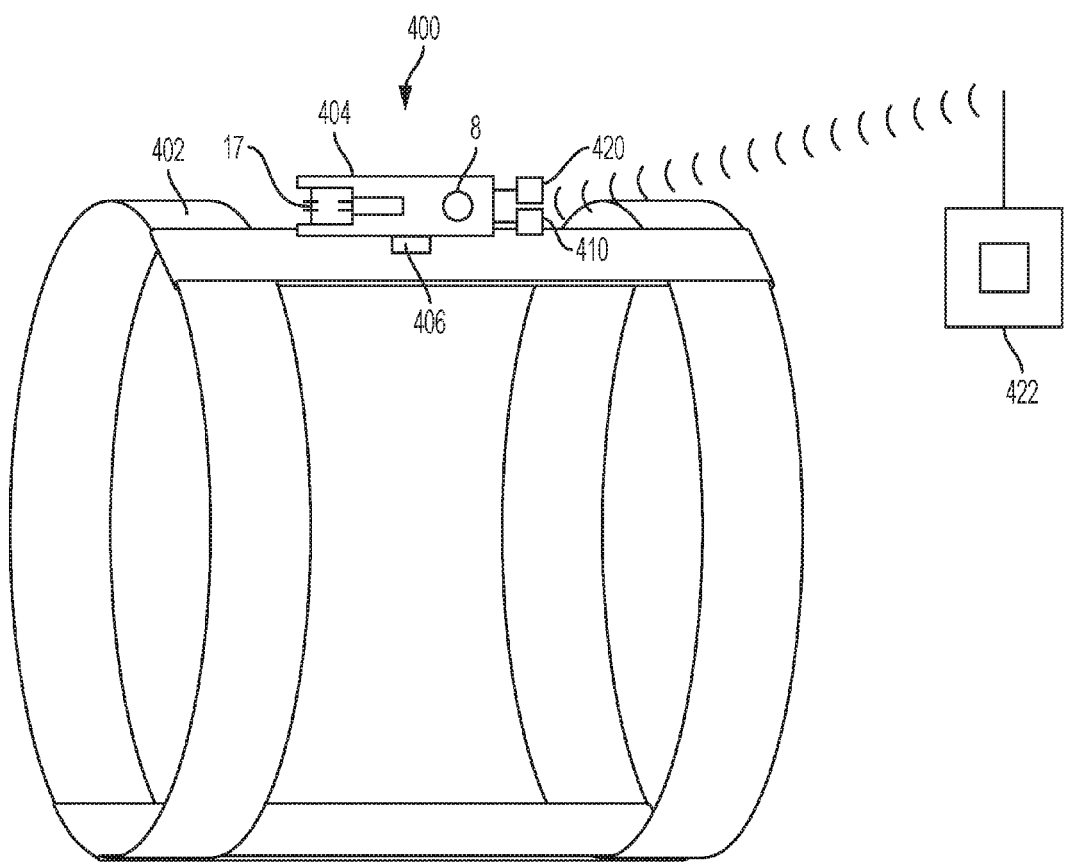
FIG. 14 illustrates an exemplary warning device worn by an animal.

Devices for training and containing dogs using shocking (taser) training devices that are mounted on a collar or harness worn by an animal, such as a dog, are now well known. Such devices can include GPS for setting boundaries and/or locating the animal, and a remote control for controlling the device. The device also can include a speaker or vibration device for use as a pre-warning. Such devices are commonly used to train hunting dogs and/or for setting boundaries for a dog. However, the device can be used for other animals, such as cats, horses, and livestock. These conventional training devices can be modified to replace the shocking taser device with the non-shocking device 2 according to the present invention. A particularly preferred system that can be modified is shown in U.S. Pat. No. 6,923,146 (Kobitz). As shown in FIG. 14, the warning device 400 can be sized to be mounted on a collar or harness 402 of an animal, preferably a dog. The body 404 replaces the external body of the device 2 described herein and includes the same internal parts as the device 2. The body 404 includes a mount 406 for connecting the device 400 to the collar or harness 402. The device 400 can be connected to or include a GPS device 410 that activates the switch 8 of the device 400 when the device 400 is in selected GPS coordinates. The device 400 can be connected to or include a remote control 420 that can be remotely operated by a remote device 422. The remote device 422 can be a remote held by a human or can be a computer. The remote device 422 can be used to operate the switch 8, convey or identify commands such as "stay" "come", "sit", "retrieve" and "flush" to the device 400 and/or to set GPS coordinates for the device 400.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:
1. An animal leash comprising:
a housing;
a cord, wherein a first end of the cord being connected to the housing;
a connector constructed to connect the cord to an animal collar or harness, the connector being connected to a second end of the cord; and an arc sound and/or vibration generating warning device connected to the housing or contained within the housing, the warning device comprising;
  a device body;
  a plurality of electrodes disposed within the device body, the electrodes being permanently encased so that no harmful electricity can be imparted into a human or animal from an arc generated across the electrodes;
  a power source;
  a transformer; and
  a switch, the electrodes being connected to the power source, the transformer, and the switch so that when the switch is activated an electrical arc is generated across the electrodes producing an arc sound and/or vibration.

2. The leash according to claim 1, further comprising a pressure sensor connected to the cord and the switch so that when a set pressure is applied to the cord by an animal connected to the leash the switch is activated by the pressure sensor turning on the warning device.

3. The leash according to claim 1, further comprising a pressure sensor connected to the cord and the switch so that when an end of the cord is reached by an animal connected to the leash the switch is activated by the pressure sensor turning on the warning device.

4. The leash according to claim 2, wherein the pressure sensor is adjustable.

5. The leash according to claim 3, wherein the pressure sensor is adjustable.

6. The leash according to claim 1, further comprising a hollow chamber defined by a chamber body, at least one of the electrodes disposed within the hollow chamber or comprising a part of the chamber body.

7. The leash according to claim 6, wherein the device body also comprising the chamber body.

8. The leash according to claim 6, wherein the chamber body being constructed to resonate the arc sound and/or vibration within the hollow chamber.

9. The leash according to claim 6, wherein the chamber body is constructed so that the hollow chamber directs the arc sound and/or vibration in a desired direction.

10. The leash according to claim 6, wherein the plurality of electrodes comprises a pair of electrodes disposed within the hollow chamber.

11. The leash according to claim 6, wherein a first electrode being disposed within the hollow chamber and the chamber body comprising a second electrode such that during use the arc is generated between the first and second electrodes, and the plurality of electrodes comprising the first and second electrodes.

12. The leash according to claim 6, wherein a first part of the chamber body comprising a first electrode and a second part of the chamber body comprising a second electrode such that during use the arc is generated between the first and second electrodes, and the plurality of electrodes comprising the first and second electrodes.

13. The leash according to claim 6, wherein the chamber body is constructed to resonate an arc sound and/or vibration in the hollow chamber that can be detected by dogs.

14. The leash according to claim 1, wherein the housing comprises the device body.

15. The leash according to claim 1, wherein the housing comprises a handle constructed to be held by a human hand.

16. A method of training an animal comprising:
  connecting an animal to the cord of claim 1; and
  generating an arc sound and/or vibration using the warning device.

17. A method of training an animal comprising:
  connecting an animal to the cord of claim 2; and
  the animal pulling on the cord so that the pressure sensor activates the switch generating an arc sound and/or vibration using the device.

18. A method of training an animal comprising:
  connecting an animal to the cord of claim 2; and
  the animal pulling on the cord so that when an and of cord is reached the pressure sensor activates the switch generating an arc sound and/or vibration using the device.

19. An animal training device comprising:
  a device body;
  a plurality of electrodes disposed within the device body, the electrodes being permanently encased so that no harmful electricity can be imparted into a human or animal from an arc generated across the electrodes;
  a power source;
  a transformer;
  a switch, the electrodes being connected to the power source, the transformer, and the switch so that when the switch is activated an electrical arc is generated across the electrodes producing an arc sound and/or vibration; and
  a global positioning device and/or remote control connected to the switch so that the switch can be activated by the global positioning device and/or remote control.

20. The device according to claim 19, further comprising a connector connected to the device body for connecting the device to a collar or harness constructed to be worn by an animal.

21. The device according to claim 19, wherein the device body is integrated with a collar or harness constructed to be worn by an animal.

22. The device according to claim 19, comprising the global positioning device and the global positioning device being programmable so that when desired positions are reached by the global positioning device the global positioning device activates the switch.

23. The device according to claim 19, comprising the remote control.

24. The device according to claim 19, further comprising a hollow chamber defined by a chamber body, at least one of the electrodes disposed within the hollow chamber or comprising a part of the chamber body.

25. The device according to claim 24, wherein the device body also comprising the chamber body.

26. The device according to claim 24, wherein the chamber body being constructed to resonate the arc sound and/or vibration within the hollow chamber.

27. The device according to claim 24, wherein the chamber body is constructed so that the hollow chamber directs the arc sound and/or vibration in a desired direction.

28. The device according to claim 24, wherein the plurality of electrodes comprises a pair of electrodes disposed within the hollow chamber.

29. The device according to claim 24, wherein a first electrode being disposed within the hollow chamber and the chamber body comprising a second electrode such that during use the arc is generated between the first and second electrodes, and the plurality of electrodes comprising the first and second electrodes.

30. The device according to claim 24, wherein a first part of the chamber body comprising a first electrode and a second part of the chamber body comprising a second electrode such that during use the arc is generated between the first and second electrodes, and the plurality of electrodes comprising the first and second electrodes.

31. The device according to claim 24, wherein the chamber body is constructed to resonate an arc sound and/or vibration in the hollow chamber that can be detected by dogs.

\* \* \* \* \*